(12) United States Patent  
Yamazaki

(10) Patent No.: US 8,554,048 B2  
(45) Date of Patent: Oct. 8, 2013

(54) INFORMATION PROCESSING APPARATUS, METHOD, AND PROGRAM

(75) Inventor: Takahiro Yamazaki, Saitama (JP)

(73) Assignee: Sony Corporation, Tokyo (JP)

( * ) Notice: Subject to any disclaimer, the term of this patent is extended or adjusted under 35 U.S.C. 154(b) by 523 days.

(21) Appl. No.: 12/856,409

(22) Filed: Aug. 13, 2010

(65) Prior Publication Data

US 2011/0044660 A1   Feb. 24, 2011

(30) Foreign Application Priority Data

Aug. 24, 2009   (JP) ................. P2009-193283

(51) Int. Cl.
*H04N 5/765*   (2006.01)

(52) U.S. Cl.
USPC ................................... 386/232

(58) Field of Classification Search
None
See application file for complete search history.

(56) References Cited

U.S. PATENT DOCUMENTS

2006/0222344 A1*   10/2006   Ukai et al. ............. 386/123

FOREIGN PATENT DOCUMENTS

JP   2006-287364   10/2006

* cited by examiner

*Primary Examiner* — Huy T Nguyen

(74) *Attorney, Agent, or Firm* — Finnegan, Henderson, Farabow, Garrett & Dunner LLP

(57) ABSTRACT

An information processing apparatus includes: a detecting portion detecting a signal format of a particular reproduction interval having the longest reproduction time among contents constituted by a plurality of reproduction intervals; and a converting portion converting signal formats of the reproduction intervals of the contents other than the particular reproduction interval into the signal format of the particular reproduction interval.

10 Claims, 15 Drawing Sheets

FIG.9

| Codecs | MPEG-2: MP@HL and MP@ML |  |
| --- | --- | --- |
|  | MEPG-4 AVC:<br>Profile: High Profile or Main Profile<br>Level: 4.1 or 4.0 (1920x1080, 1440x1080, 1280x720)<br>4.1, 4.0, 3.2, 3.1 or 3.0 (720x480, 720x576)<br><br>SMPTE VC-1:<br>Profile: Advanced profile<br>Level: 3 (1920x1080, 1440x1080, 1280x720)<br>2 (720x480, 720x576) | |
| HD | 1920x1080x59.94i, 50i (16:9)<br>1920x1080x24p, 23.976p (16:9)<br>1440x1080x59.94i, 50i (16:9)<br>1440x1080x24p, 23.976p (16:9)<br>1280x720x59.94p, 50p (16:9)<br>1280x720x24p, 23.976p (16:9) | |
| SD | 720x480x59.94i (4:3/16:9), 720x576x50i (4:3/16:9) | |

FIG.10

| | TYPES OF VIDEO SIGNALS FROM DISC |
|---|---|
| I-1 | 1920x1080x59.94i(16:9) |
| I-2 | 1920x1080x50i(16:9) |
| I-3 | 1920x1080x24p(16:9) |
| I-4 | 1920x1080x23.976p(16:9) |
| I-5 | 1440x1080x59.94i(16:9) |
| I-6 | 1440x1080x50i(16:9) |
| I-7 | 1440x1080x24p(16:9) |
| I-8 | 1440x1080x23.976p(16:9) |
| I-9 | 1280x720x59.94p(16:9) |
| I-10 | 1280x720x50p(16:9) |
| I-11 | 1280x720x24p(16:9) |
| I-12 | 1280x720x23.976p(16:9) |
| I-13 | 720x480x59.94i(16:9) |
| I-14 | 720x480x59.94i(16:9) |
| I-15 | 720x576x50i(4:3) |
| I-16 | 720x576x50i(16:9) |
| I-17 | 704x480x59.94i(4:3) |
| I-18 | 352x480x59.94i(4:3) |
| I-19 | 352x240x59.94i(4:3) |
| I-20 | 704x576x50i(4:3) |
| I-21 | 352x576x50i(4:3) |
| I-22 | 352x288x50i(4:3) |

| | HDMI TYPE OUTPUT RESOLUTIONS |
|---|---|
| H-1 | 720x576x50i(4:3) |
| H-2 | 720x576x50i(16:9) |
| H-3 | 720x480x59.94i(4:3) |
| H-4 | 720x480x59.94i(16:9) |
| H-5 | 720x576x50p(4:3) |
| H-6 | 720x576x50p(16:9) |
| H-7 | 720x480x59.94p(4:3) |
| H-8 | 720x480x59.94p(16:9) |
| H-9 | 720x480p(4:3) |
| H-10 | 720x480p(16:9) |
| H-11 | 1280x720x59.94p(16:9) |
| H-12 | 1280x720x60p(16:9) |
| H-13 | 1280x720x50p(16:9) |
| H-14 | 1280x720x24p(16:9) |
| H-15 | 1920x1080x59.94i(16:9) |
| H-16 | 1920x1080x50i(16:9) |
| H-17 | 1920x1080x24p(16:9) |
| H-18 | 1920x1080x23.976p(16:9) |

| | COMPOSITE TYPE OUTPUT RESOLUTIONS |
|---|---|
| C-1 | 720x576x50i(4:3) |
| C-2 | 720x576x50i(16:9) |
| C-3 | 720x480x59.94i(4:3) |
| C-4 | 720x480x59.94i(16:9) |

INFORMATION PROCESSING APPARATUS, METHOD, AND PROGRAM

BACKGROUND OF THE INVENTION

1. Field of the Invention

The present invention relates to an information processing apparatus, method, and program. More particularly, the invention relates to an information processing apparatus, method, and program which allow contents to be reproduced without interruption.

2. Description of the Related Art

Recently, the HDMI (High-Definition Multimedia Interface) standard is broadly adopted, and connection is established using an HDMI cable in increasing occasions such as when a Blu-ray disc recorder is connected to a television receiver. According to the HDMI standard, authentication is carried out before signals are transmitted between an apparatus at a transmitting end and an apparatus at a receiving end. For example, a blu-ray disc recorder as a transmitting apparatus acquires EDID (extended display identification) data from a television receiver as a receiving apparatus, identifies the specifications of the television receiver, and transmits data in a format in accordance with the specification (for example, see JP-2006-287364 (Patent Document 1)).

SUMMARY OF THE INVENTION

A blu-ray disc having one content item contains various pieces of information recorded in various signal formats, including notices on the content item, the logotype of the manufacture of the disc, highlight scenes of movies for advertizing the disc manufacturer, a JAVA read-in screen, a menu, and the content item itself.

For example, the signal formats of the piece of information are set as follows.

Notices on the appreciation of the disc: 1080/23.97p
Logotype of the disc manufacturer: 1080i/59.94
Highlight scenes of movies for advertizing the disc manufacturer: 1080/23.97p
A menu set for the content item: 1080i/59.94
Content: 1080/23.97p In the above description, the number "1080" represents an effective scan line count; the character "i" represents the interlace scan method; the numbers 23.97 and 59.94 represent frame counts or field counts; and the character "p" represents the progressive scan method.

When video signals and audio signals are transmitted according to the HDMI standard, the signals are muted each time the signal format of the video signals or audio signals changes to allow re-connection and re-authentication steps to be performed. Since authentication takes several seconds, the screen temporarily displays no image (the screen turns black) each time the signal format of video signals or audio signals changes. When the apparatus outputting the video signals is an apparatus having a complicated configuration such as a projector, it takes a longer time for the apparatus to be enabled to display proper images. As a result, the user will have to see a black screen or a screen unique to the apparatus (i.e., images other than contents which should be displayed) a greater number of times.

Under such circumstances, it is desirable to allow contents to be reproduced without interruption.

According to an embodiment of the invention, there is provided an information processing apparatus including a detecting portion detecting a signal format of a particular reproduction interval having the longest reproduction time among contents constituted by a plurality of reproduction intervals and a converting portion converting signal formats of the reproduction intervals of the contents other than the particular reproduction interval into the signal format of the particular reproduction interval.

The information processing apparatus may further include an output portion converting the contents having the converted signal formats into signals according to the HDMI standard and outputting the signal to another apparatus.

The signal formats may be defined by a video signal resolution and an audio signal encoding/compression method.

The information processing apparatus may further include a reproducing portion reproducing the contents from a disc.

The information processing apparatus may further include a storage portion for storing the signal format of the particular reproduction interval of the disc when the disc is reproduced and a retrieving portion retrieving the signal format of the particular reproduction interval stored in the storage portion when the disc is reproduced again.

The detecting portion may detect a main item of the contents as the particular reproduction interval.

The information processing apparatus may further include a recording portion recording the signal format of the particular reproduction interval as a file separate from the content.

The information processing apparatus may further include a retrieving portion retrieving the signal format of the particular reproduction interval from a server through a network.

According to another embodiment of the invention, there is provided an information processing method of an information processing apparatus having a detecting portion and a converting portion. According to the method, the detecting portion detects a signal format of a particular reproduction interval having the longest reproduction time among contents constituted by a plurality of reproduction intervals, and the converting portion converts signal formats of the reproduction intervals of the contents other than the particular reproduction interval into the signal format of the particular reproduction interval.

According to still another embodiment of the invention, there is provided a program for causing a computer to function as detecting means and converting means. The detecting means detects a signal format of a particular reproduction interval having the longest reproduction time from contents constituted by a plurality of reproduction intervals, and the converting means converts signal formats of the reproduction intervals of the contents other than the particular reproduction interval into the signal format of the particular reproduction interval.

According to the embodiment of the invention, a signal format of a particular reproduction interval having the longest reproduction time among contents constituted by reproduction intervals is detected, and signal formats of the reproduction intervals of the contents other than the particular reproduction interval are converted into the signal format of the particular reproduction interval.

According to the embodiments of the invention, contents can be reproduced without interruption.

BRIEF DESCRIPTION OF THE DRAWINGS

FIG. 9 is a table for explaining specifications of video streams;

FIG. 10 is tables for explaining signal format conversion;

DESCRIPTION OF PREFERRED EMBODIMENTS

<First Embodiment>
[Configuration of Information Processing System]

Figure 1:
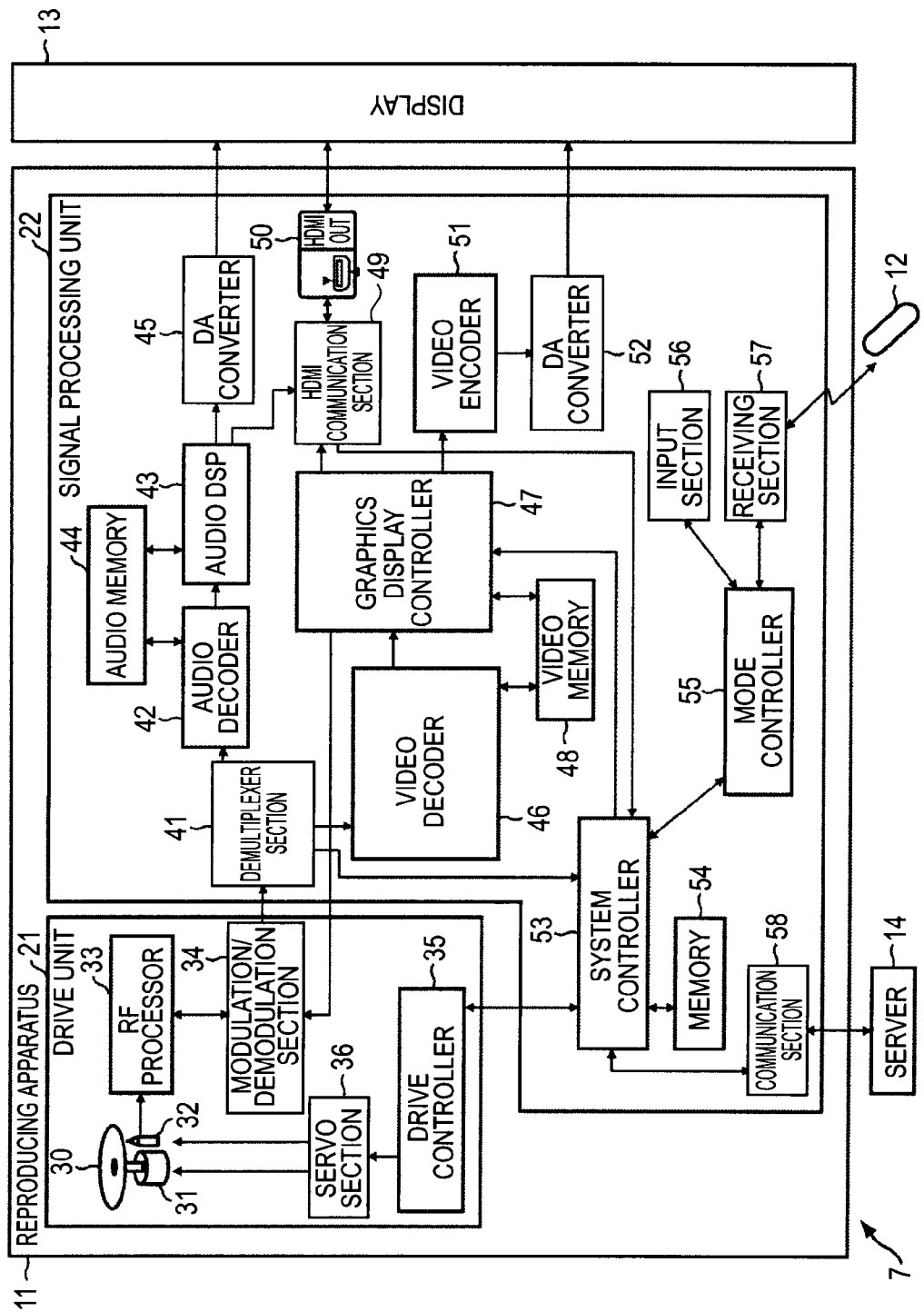
FIG. 1 is a block diagram showing a configuration of an embodiment of an information processing system according to the invention.

FIG. 1 is a block diagram showing a configuration of an information processing system 1 according to an embodiment of the invention. The information processing system 1 includes a reproducing apparatus 11 which may be, for example, a blu-ray disc recorder and a display 13 which may be, for example, a television receiver. A remote controller 12 is provided for remote control of the reproducing apparatus 11.

The reproducing apparatus 11, which is an information processing apparatus, includes a drive unit 21 and a signal processing unit 22.

The drive unit 21 includes a motor 31, an optical head 32, an RF processor 33, a modulation/demodulation section 34, a drive controller 35, and a servo section 36.

The motor 31 rotates a disc 30 which may be a blu-ray disc, a DVD (digital versatile disc), a CD (compact disc), or the like. The optical head 32 records data in the disc 30 or reproduces data from the disc 30. The RF processor 33 converts a signal in an RF band reproduced from the disc 30 into a signal in a baseband. The processor also converts a signal in the baseband to be recorded in the disc 30 into a signal in the RF band. Specifically, an RLL (1,7) code modulation signal is demodulated and converted into a digital signal, and a digital signal is converted into an RLL (1,7) code modulation signal.

The modulation/demodulation section 34 demodulates signals supplied from the RF processor 33, performs error correction on the signals, and outputs them as an UDF (universal disc format) stream. The modulation/demodulation section 34 adds error correction codes to signals to be recorded in the disc 30, modulates the signals, and outputs the signals to the RF processor 33.

The drive controller 35 controls operations of the drive unit 21. The servo section 36 controls the rotation of the motor 31 under control exercised by the driver controller 35, and the section also exercises focus control, tracking control, and radial control of the optical head 32.

The signal processing unit 22 includes a demultiplexer section 41, an audio decoder 42, an audio DSP (digital signal processor) 43, an audio memory 44, a DA converter 45, a video decoder 46, a graphics display controller 47, a video memory 48, an HDMI communication section 49, an HDMI terminal 50, a video encoder 51, a DA converter 52, a system controller 53, a memory 54, a mode controller 55, an input section 56, a receiving section 57, and a communication section 58.

The demultiplexer section 41 separates signals supplied from the modulation/demodulation section 34 of the drive unit 21 into audio signals to be output to the audio decoder 42 and video signals to be output to the video decoder 46. The audio decoder 42 decodes encoded audio signals input thereto using an appropriate method and outputs resultant signals to the audio DSP 43. The audio DSP 43 serving as a converting section performs a process of converting a signal format of audio signals (an encoding/compression method such as linear PCM, AC-3, DTS (Digital Theater Systems), AAC (Advanced Audio Coding), or Dolby TrueHD) into another format. For example, PCM audio signals are converted into audio signals according to Dolby TrueHD. The audio memory 44 is provided for temporarily storing data required for processes performed by the audio decoder 42 and the audio DSP 43. The DA converter 45 performs DA conversion of audio signals supplied from the audio DSP 43 and outputs resultant signals to an apparatus connected to the same.

The video decoder 46 decodes video signals input thereto and outputs resultant signals to the graphics display controller 47. Specifically, video signals encoded using methods such as MPEG2, H.264AVC, and VC-1 are decoded according to the respective methods. The graphics display controller 47 synthesizes decoded video signals with icons and characters used for user interfaces, subtitles to be displayed during the reproduction of the disc, and screens for the picture-in-picture (PinP) effect. The graphics display controller 47, which also serves as a converting section, has the function of converting a signal format of video signals into another (in this embodiment, for example, a resolution is converted into another as shown in FIG. 10 which will be described later). Specifically, the controller has a scaler function for increasing or decreasing the resolution of images and a frame rate changing function. The video memory 48 is provided for storing video signals required for the processes performed by the video decoder 46 and the graphics display controller 47 as occasion demands.

The HDMI communication section 49 serving as an output section outputs video signals output by the graphics display controller 47 and audio signals output by the audio DSP 43 to the display 13, which is connected to the HDMI terminal 50, through an HDMI cable.

The video encoder 51 encodes digital video signals output by the graphics display controller 47 to convert the signals into composite video signals according to the NTSC method or PAL method. The DA converter 52 performs DA conversion of such composite video signals and outputs resultant signals to an apparatus connected to the same. When the HDMI terminal 50 is connected to the display 13, there is no need for supplying video signals output by the DA converter 52 and audio signals output by the DA converter 45 to the display 13. The signals output by the DA converter 52 and the DA converter 45 are supplied when neither video signals nor audio signals are supplied from the HDMI terminal 50 through the HDMI cable.

The system controller 53 constituted by, for example, a microprocessor controls the drive unit 21 through the driver controller 35 and controls the graphics display controller 47 of the signal processing section 22. The memory 54 is provided for storing data required for the processes performed by the system controller 53 as occasion demands.

The mode controller 55, which manages user interfaces, is connected to the input section 56 and the receiving section 57.

The input section 56 is constituted by keypad buttons and icons displayed on a display device, and the section inputs instructions from a user to the mode controller 55. The receiving section 57 receives infrared signals from the remote controller 12 and outputs the received signals to the mode controller 55. The communication section 58 communicates with a server 14 through the internet (not shown) under control exercised by the system controller 53.

[Configuration of System Controller]

Figure 2:
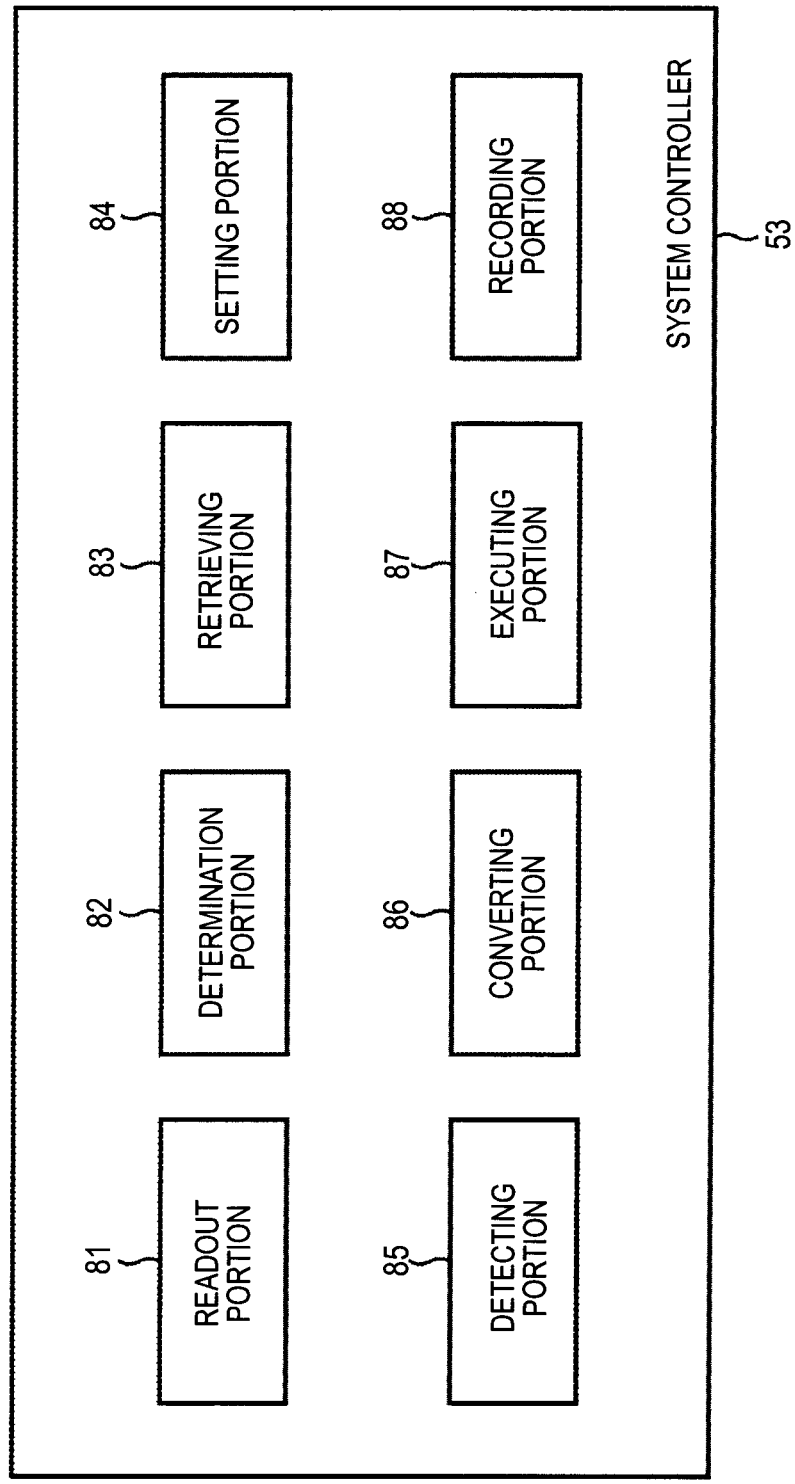
FIG. 2 is a block diagram showing a functional configuration of a system controller.

FIG. 2 is a block diagram showing a functional configuration of the system controller. The system controller 53 includes a readout portion 81, a determination portion 82, a retrieving portion 83, a setting portion 84, a detecting portion 85, a converting portion 86, an executing portion 87, and a recording portion 88.

The readout portion 81 reads out various types of data. The determination portion 82 makes various types of determination. The retrieving portion 83 retrieves various types of data. The setting portion 84 sets a reference resolution. The detecting portion 85 detects the resolution of a longest play item.

The converting portion 86 converts a resolution into another. The executing portion 87 executes various processes. The recording portion 88 records data in the disc 30 or memory 54.

[Configuration of Graphics Display Controller]

Figure 3:
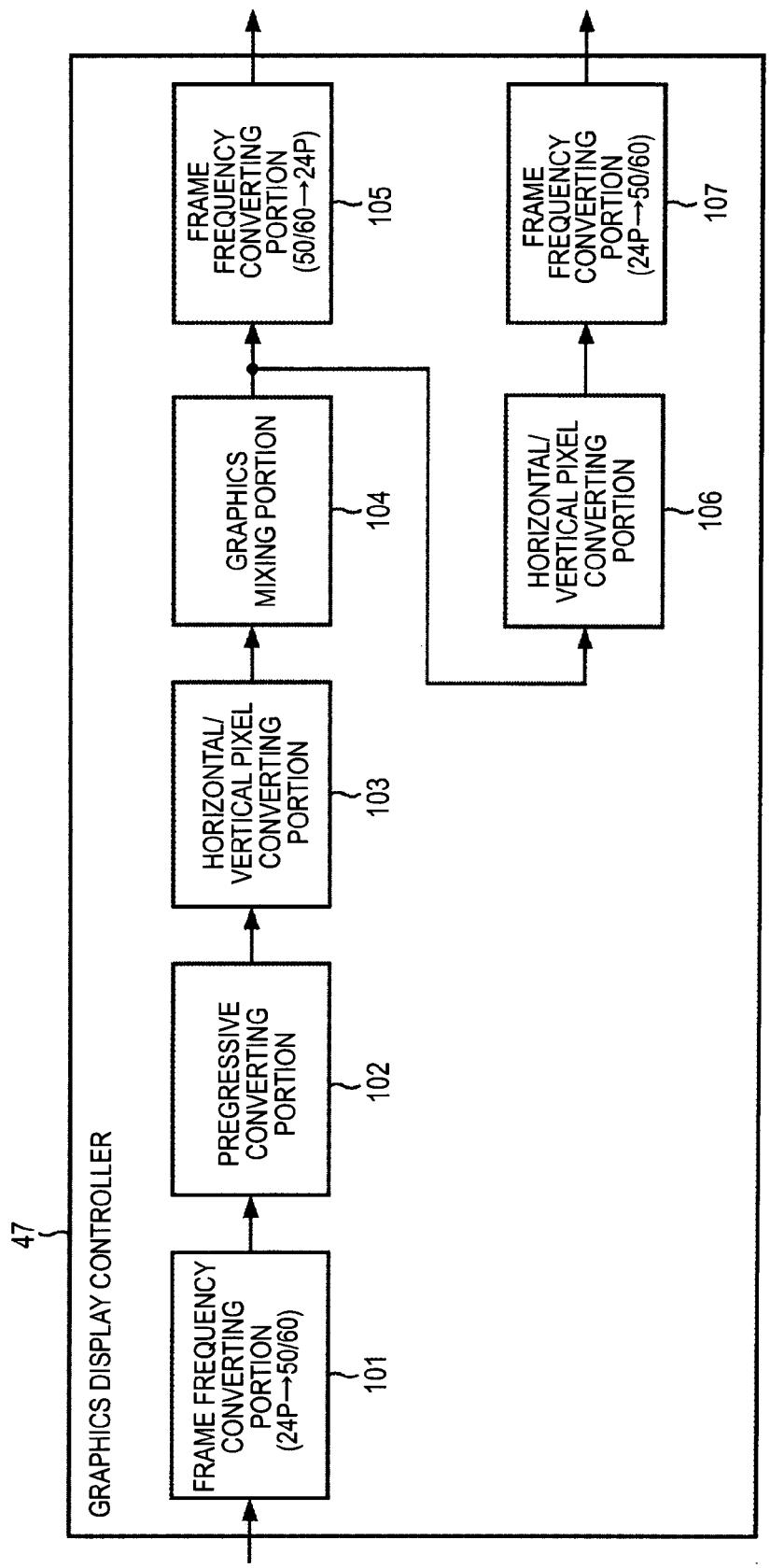
FIG. 3 is a block diagram showing a configuration of a graphics display controller.

FIG. 3 is a block diagram showing a configuration of the graphics display controller 47. The graphics display controller 47 includes a frame frequency converting portion 101, a progressive converting portion 102, a horizontal/vertical pixel converting portion 103, a graphics mixing portion 104, a frame frequency converting portion 105, a horizontal/vertical pixel converting portion 106, and a frame frequency converting portion 107.

The frame frequency converting portion 101 converts the frame rate of a video signal supplied from the video decoder 46 from 24p to a frame rate (or field rate) of 50 or 60 frames (or fields)/sec. For simplicity, the term "frame rate" will be hereinafter used. While the conversion may involve arbitrary steps, for example, steps disclosed in Patent Document JP-A-4-273678 may be used. In the case of a video signal having a frame rate of 50 or 60 frames/sec, the frame frequency converting portion 101 performs no particular process on the signal. When an interlace type video signal is input from the frame frequency converting portion 101 to the progressive converting portion 102, the progressive converting portion 102 converts the signal format into the progressive format. When the input video signal is in the progressive format, no particular process is performed on the signal.

The horizontal/vertical pixel converting portion 103 interpolates pixels of a video signal input from the progressive converting portion 102 in the horizontal or vertical direction as occasion demands to increase or decrease the number of pixels in the horizontal direction or the number of lines extending in the horizontal direction accordingly. The graphics mixing portion 104 performs a process of synthesizing a video signal input from the horizontal/vertical pixel converting portion 103 with icons, characters, and images such as a picture in picture. The frame frequency converting portion 105 converts a signal having a frame rate of 50 or 60 frames/sec. input from the graphics mixing portion 104 into a signal having a frame rate of 24 frames/sec. and also converts the format of the signal into the progressive format. A video signal thus output from the frame frequency converting portion 105 is an HD signal.

The horizontal/vertical pixel converting portion 106 interpolates pixels of a video signal input from the graphic mixing portion 104 in the horizontal or vertical direction as occasion demands to increase or decrease the number of pixels in the horizontal direction or the number of lines extending in the horizontal direction accordingly. The frame frequency converting portion 107 converts the frame rate of a video signal input from the horizontal/vertical pixel converting portion 106 from 24p into a frame rate of 50 to 60 frames/sec. A video signal thus output from the frame frequency converting portion 107 is an SD signal.

The output of the frame frequency converting portion 105 or 107 whichever is compatible with the specifications of the display 13 provided downstream of the portions is selectively supplied to the display 13.

Each of the frame frequency converting portion 101, the progressive conversion 102, the horizontal/vertical pixel converting portion 103, the graphics mixing portion 104, the frame frequency converting portion 105, the horizontal/vertical pixel converting portion 106, and the frame frequency converting portion 107 operates as occasion demands. As a result, any of the video signal formats represented by reference numerals I-1 to I-22 in the left column of FIG. 10 which will be described later is converted into any of the signal formats represented by reference numerals H-1 to H-18 in the column in the middle or any of the signal formats represented by reference numerals C-1 to C-4 in the right column. The format C-4 maybe used as a fixed signal format for composite type video signals.

[Directory]

Figure 4:
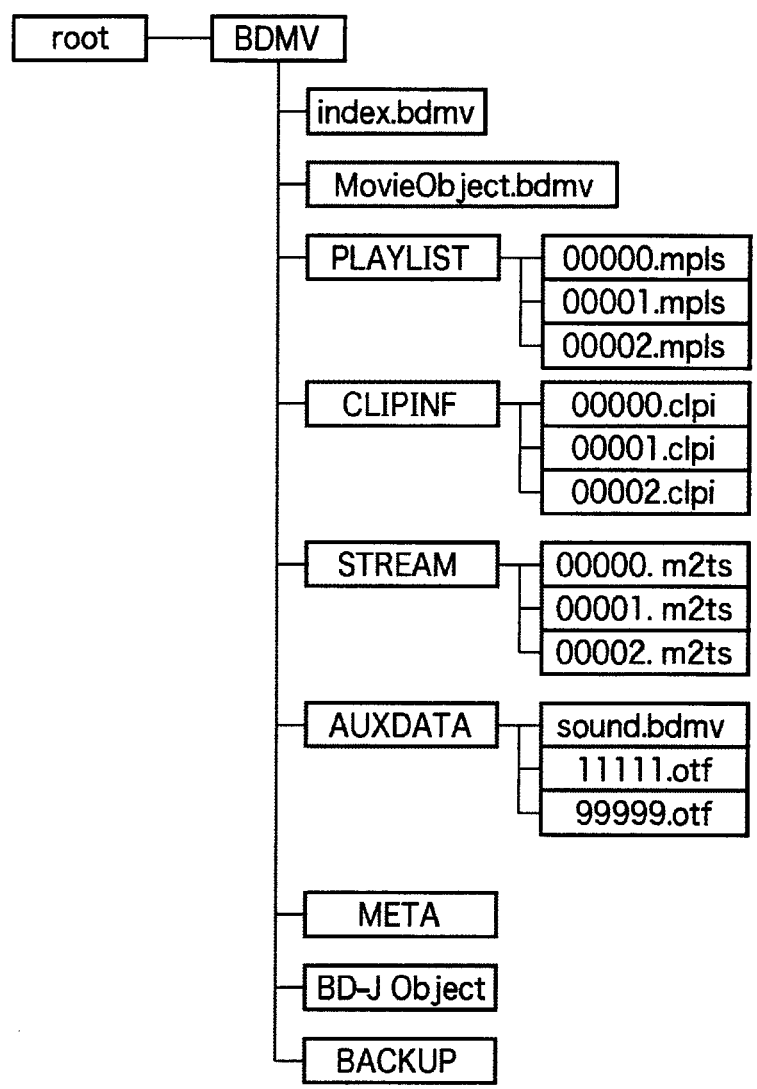
FIG. 4 is an illustration for explaining a directory.

FIG. 4 is an illustration for explaining a BD-ROM application format directory. "BDMV" represents a directory "BD-ROM" which includes directories "PLAYLIST", "CLIPINF", "STREAM", "AUXDATA", "META data", "BD-J Object", and "BACKUP".

Contents stored in each directory are as follows.

A directory "index.bdmv" is a directory for management information on the entire directories, and an index table is stored in this directory.

"MovieObject.bdmv" represents a directory for storing movie objects.

The directory "PLAYLIST" contains database files for movie play lists. One play list corresponds to one file. In the present embodiment, three files, i.e., files "0000.mpls", "0001.mpls", and "0002.mpls" are stored in the directory.

The directory "CLIPINF" contains database files for clips. What is stored in the directory is characteristics of clip AV streams and points where the reproduction of the streams can be started. In the present embodiment, three files, i.e., files "0000.clpi", "0001.clpi", and "0002.clpi" are stored.

The directory "STREAM" contains clip AV stream files, and MPEG-2 AV transport stream files are stored in the directory. The files have a structure known as "BDAV MPEG-2 transport stream". In the present embodiment, three files, i.e., files "0000.m2ts", "0001.m2ts", and "0002.m2ts" are stored in the directory.

Files associated with sound effects data and fonts are stored in the directory "AUXDATA". In the present embodiment, three files, i.e., files "sound.bdmv", "1111.otf", and "99999.otf" are stored.

XML metadata used for title search are stored in the directory "META".

An interactive JAVA application is stored in the directory "BD-J Object".

A backup file is stored in the directory "BACKUP".

In the present embodiment, for example, resolution information and an audio format contained in a disc 30 is acquired as any of pieces of information as listed below.

1. attribute information (resolution, an aspect ratio, an audio format, and an audio channel count) described in a clip information file 2. a resolution, aspect ratio information, and audio format information (such as linear PCM, AC-3, DTS, and AAC) described in a predetermined area (sequence header) defined in an MPEG format 3. metadata and database files (database files "PLAYLIST" and "CLIPINF")

The reproduction time of each program is acquired from any of the following items.

1. a movie play list
2. metadata and database files (database files "PLAYLIST" and "CLIPINF")
3. a clip information file

[Configuration of Transport Stream]

Figure 5:
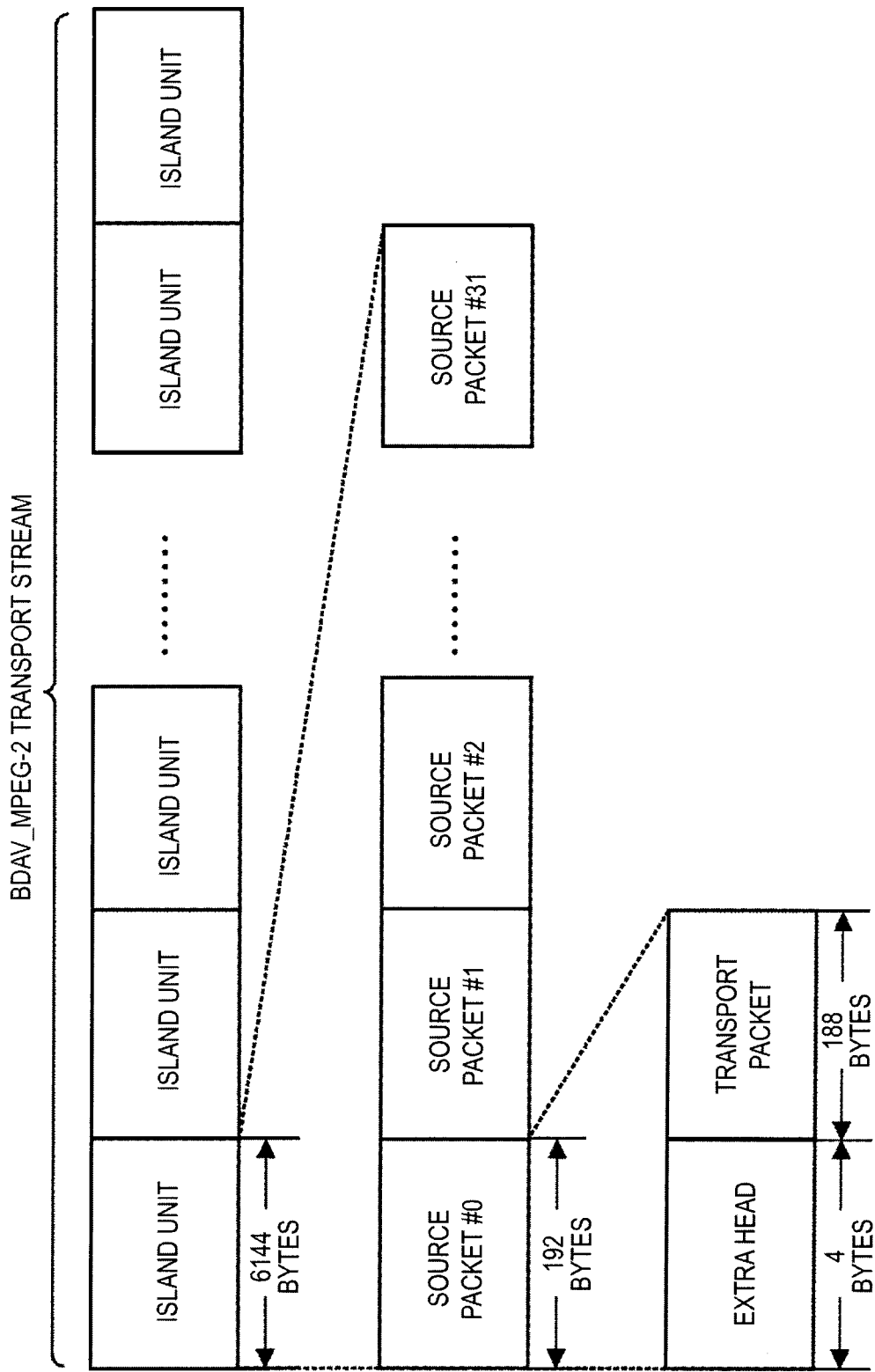
FIG. 5 is an illustration for explaining a configuration of a BDAV_MPEG-2 transport stream.

FIG. 5 is an illustration for explaining a configuration of a BDAV_MPEG-2 transport stream stored in the directory "STREAM".

A BDAV_MPEG-2 transport stream is formed by one or more aligned units. The size of an aligned unit is 6144 bytes (2048×3 bytes), and one aligned unit is formed by 32 source packets. The length of a source packet is 192 bytes. One source packet is formed by an extra header ("TP_extra header") having a length of 4 bytes and a transport packet having a length of 188 bytes. Data are recorded and edited separately for each of aligned units each having 6144 bytes.

[Configuration of Index Table]

Figure 6:
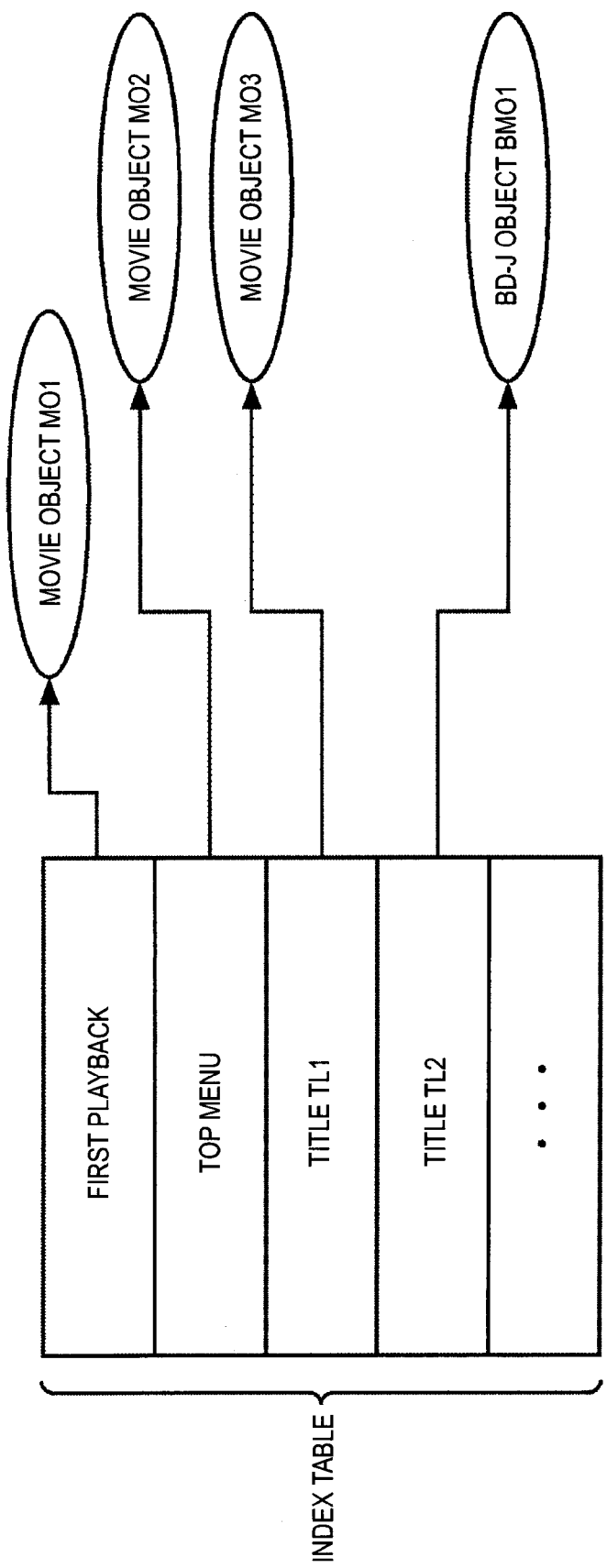
FIG. 6 is an illustration for explaining a configuration of an index table.

FIG. 6 is an illustration for explaining a configuration of an index table included in a directory "index.bdmv". The index table defines titles and a top menu of a BD-ROM disc. The index table includes entry points of all titles and a top menu.

A first playback, a top menu, a title TL1, a title TL2, and so on are described in the index table shown in FIG. 6. The first playback is used to enable automatic reproduction. In the present embodiment, a movie object MO1 is automatically reproduced. The top menu is displayed by reproducing a movie object MO2. The title TL1 is displayed by reproducing a movie object MO3. The title T12 is displayed by reproducing a BD-J movie object BMO1.

[Relationship between Movie Objects and Play Lists]

Figure 7:
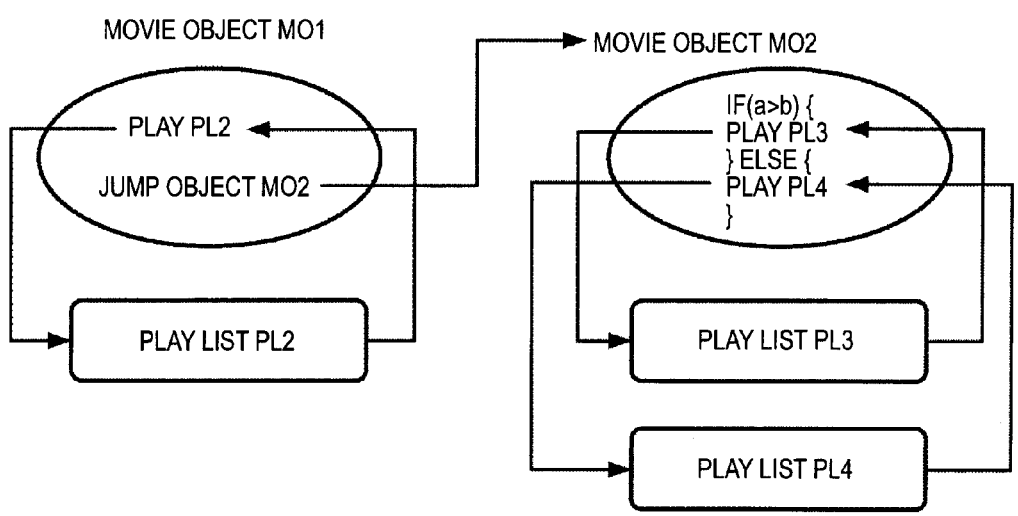
FIG. 7 is an illustration for explaining a relationship between movie objects and play lists.

FIG. 7 is an illustration for explaining a relationship between movie objects and play lists.

Movie objects are navigation command programs that can be executed. Movie objects are present in layers above play lists. In the case of the example shown in FIG. 7, two commands, i.e., commands "Play PL2" and "Jump Object MO2" are described in the movie object MO1. The command "Play PL2" is a command instructing the reproduction of a play list PL2, and the command "Jump Object MO2" is a command instructing a jump to a movie object MO2.

A command for executing a command "Play PL3" if a is greater than b and executing a command "Play PL4" if not is described in the movie object MO2. Specifically, a play list PL3 is reproduced if a is greater than b, and a play list PL4 is reproduced if a is equal to or smaller than b.

[Play List]

Figure 8:
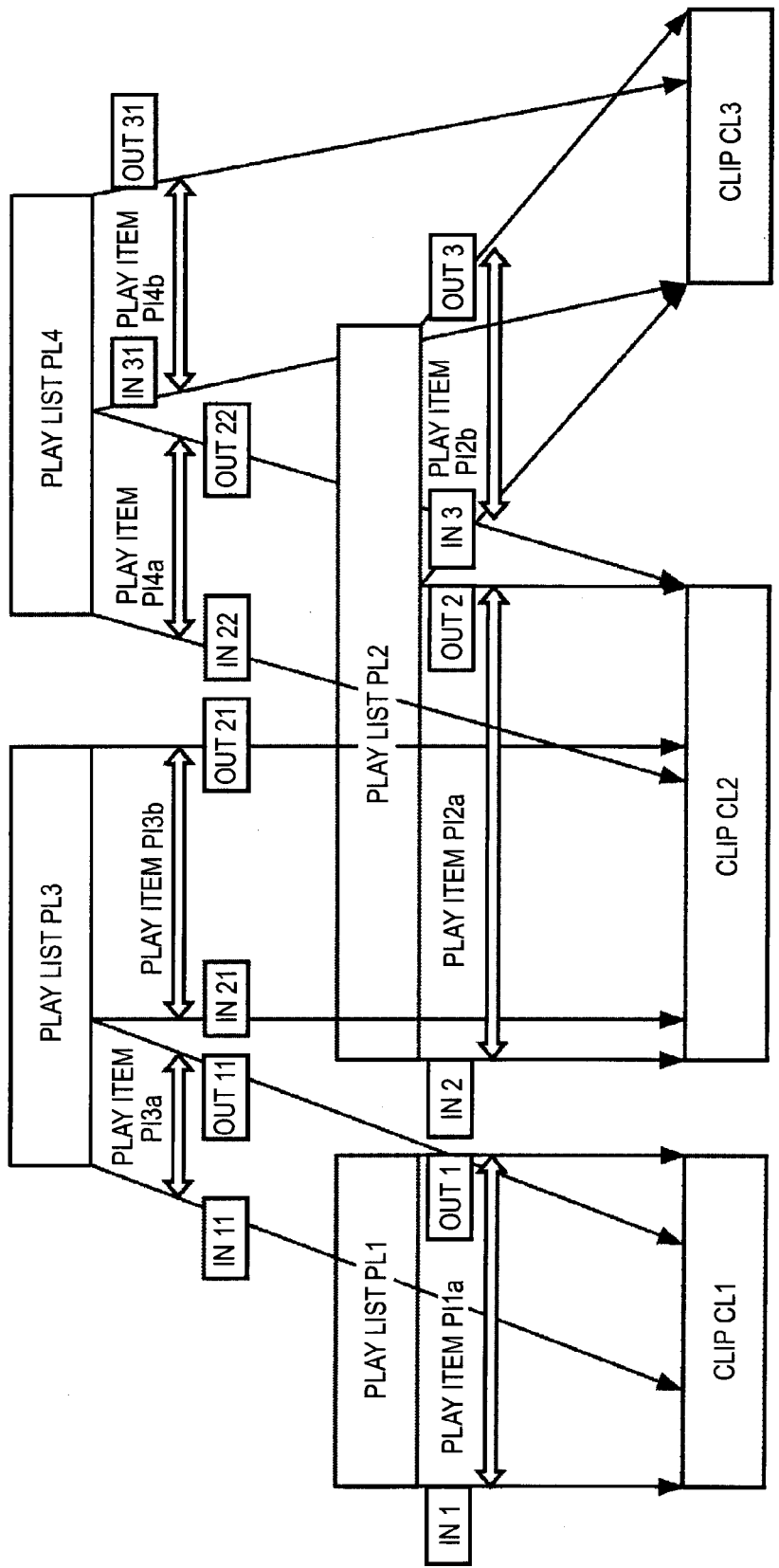
FIG. 8 is a diagram for explaining play lists.

FIG. 8 is a diagram for explaining play lists. A play list is a collection of reproduction intervals of clips. A reproduction interval is also referred to as a play item, and the term means the interval between an in-point that is the start point of reproduction and an out-point that is the end point of the reproduction. A clip is formed by a clip AV stream file and a clip information file.

In the example shown in FIG. 8, a play list PL1 is formed by a play item PI1a that is the interval from an in-point In1 of a clip CL1 up to an outpoint Out1 of the clip. The clip CL1 is formed by a clip AV stream file and a clip information file. An MPEG-2 transport stream is stored in the clip AV stream file. Time stamps of access points of AV streams associated with the transport stream are stored in the clip information file.

A play list PL2 is formed by a play item PI2a that is the interval from an in-point In2 of a clip CL2 up to an outpoint Out2 of the clip and a play item PI2b that is the interval from an in-point In3 of a clip CL3 up to an outpoint Out3 of the clip. A play list PL3 is formed by a play item PI3a that is the interval from an in-point In11 of the clip CL1 up to an outpoint Out11 of the clip and a play item PI3b that is the interval from an in-point In21 of the clip CL2 up to an outpoint Out21 of the clip. A play list PL4 is formed by a play item PI4a that is the interval from an in-point In22 of the clip CL2 up to an outpoint Out22 of the clip and a play item PI4b that is the interval from an in-point In31 of the clip CL3 up to an outpoint Out31 of the clip.

[Specifications of Video Streams]

FIG. 9 is a table for explaining specifications of video streams recorded in the BD-ROM. Any of three types of codecs, i.e., MPEG-2, MPEG-4 AVC, and SMPTE VC-1 is used. The MPEG-2 codec is specified as MP@HL and MP@HL. The profile of the MPEG-4 AVC codec is specified as High Profile or Main Profile, and the level of the codec may be 4.1 or 4.0 (1920×1080, 1440×1080, 1280×720), 4.1, 4.0, 3.2, 3.1, or 3.0 (720×480, 720×576). The profile of the SMPTE VC-1 codec is specified as Advanced profile, and the level of the codec is 3 (1920×1080, 1440×1080, 1280×720) or 2(720×480, 720×567).

In a numerical expression such as 1920×1080, the former number represents a pixel count in the horizontal direction, and the latter number represents a pixel count (line count) in the vertical direction.

Any of six signal formats, i.e., "1920×1080×59.94-i, 50-i (16:9)", "1920×1080×24p, 23.976 (16:9)", "1440×1080×59.94i, 50i(16:9)", "1440×1080×24p, 23.976 (16:9)", "1280×720×59.94p, 50p(16:9)", and "1280×720× 24p, 23.976p (16:9)" is used in the HD mode, in which "16:9" represents an aspect ratio.

Either of signal formats "720×480×59.94i (4:3/16:9)" and "720×576×50i(4:3/16:9)" is used in the SD mode.

[Conversion of Signal Format]

FIG. 10 is tables for explaining signal format conversion. A video signal reproduced from a disc 30 and input to the graphics controller 47 has any of signal formats I-1 (1920× 1080×59.94i(16:9)) to I-22 (352×288×50i(4:3)) shown in the left column of FIG. 10. A video signal output from the graphics controller 47 has any of signal formats (resolutions in the present embodiment) H-1 (720×576×50i(16:9)) to H-18 (1920×1080×23.976p(16.9)) shown in the column in the middle of FIG. 10 when the signal is an HDMI type video signal output from the HDMI terminal 50. When the video signal is a composite video signal output from the DA converter 52, the signal has any of signal formats C-1 (720×576× 50i(4:3)) to C-4 (720×480×59.94i(16:9)) shown in the right column of FIG. 10.

Numbers such as 59.94i represent frame rates.

[Configuration of Contents]

Figure 11:
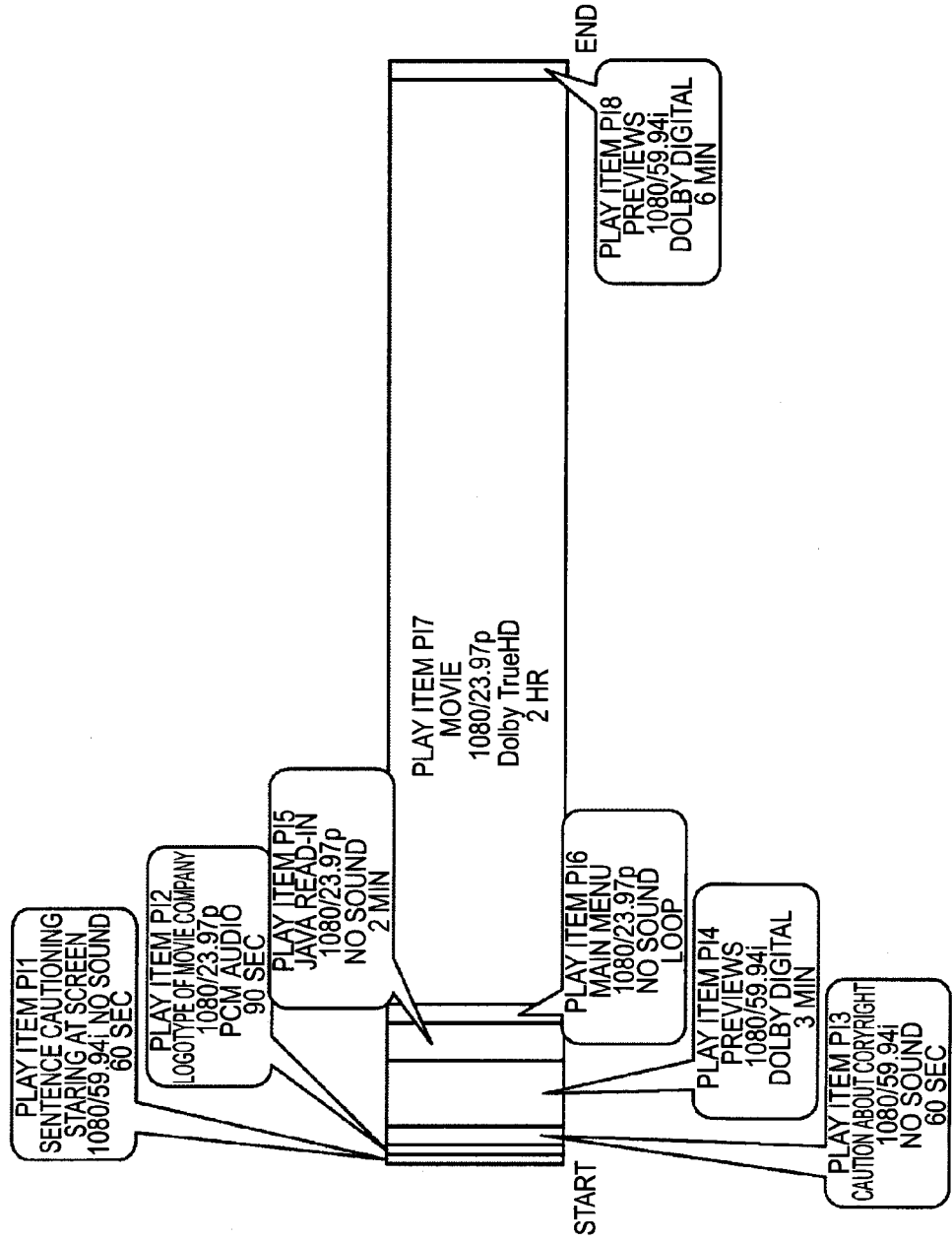
FIG. 11 is an illustration of a configuration of content.

FIG. 11 is an illustration of a configuration of contents. The contents shown in FIG. 11 include eight play items, i.e., play items PI1 to PI8, and the reproduction time of the entire contents is 2 hr 14 min 30 sec. The play item PI1 is a sentence cautioning against staring at the screen. The play item has a resolution of 1080/59.94i, no sound, and a duration of 60 sec. The play item PI2 is the logotype of the movie company. The resolution is 1080/23.9p, and the audio signals are PCM signals. The play item has a duration of 90 sec.

The play item PI3 is a caution about the copyright. The play item has a resolution of 1080/59.94i, no sound, and a duration of 60 sec. The play item PI4 is previews having a resolution of 1080/59.94i, and the audio signals are Dolby digital signals. The play item has a duration of 3 minutes.

The play item PI5 is JAVA read-in. The play item has a resolution of 1080/23.97p, no sound, and a duration of 2 minutes. The play item PI6 is a main menu which has a resolution of 1080/23.97p and no sound. The play item is looped.

The play item PI7 is the main part of the movie. The resolution is 1080/23.97p, and the audio signals are Dolby TrueHD signals. The play item has a duration of 2 hours. The play item PI8 is previews having a resolution of 1080/59.94i, and the audio signals are Dolby digital signals. The play item has a duration of 6 minutes.

When one content item reproduced from the disc 30 is configured as shown in FIG. 11, the play item PI7 having a reproduction time of 2 hours is the longest play item among the play items PI1 to PI8 in terms of reproduction time. In the present embodiment, the signal formats of video signals of the play items PI1 to PI6 and PI8 are converted by the graphics display controller 47 into a signal format in accordance with the longest play item PI7 that is a particular reproduction interval. The signal formats of audio signals of those play items are converted by the audio DSP 43 into a signal format in accordance with the longest play item PI7 that is a particular reproduction interval. Specifically, the resolutions of the play items PI1 to PI6 and PI8, i.e., the signal formats of the video signals of those play items are converted into the resolution of the longest play item PI7 (1080/23.97p), and the resultant signals are output. The formats of the audio signals of the play items PI1 to PI6 and PI8 are converted into the format of the longest play item PI7 (Dolby TrueHD), and the resultant signals are output.

[Medium Reproduction Process]

Figure 12:
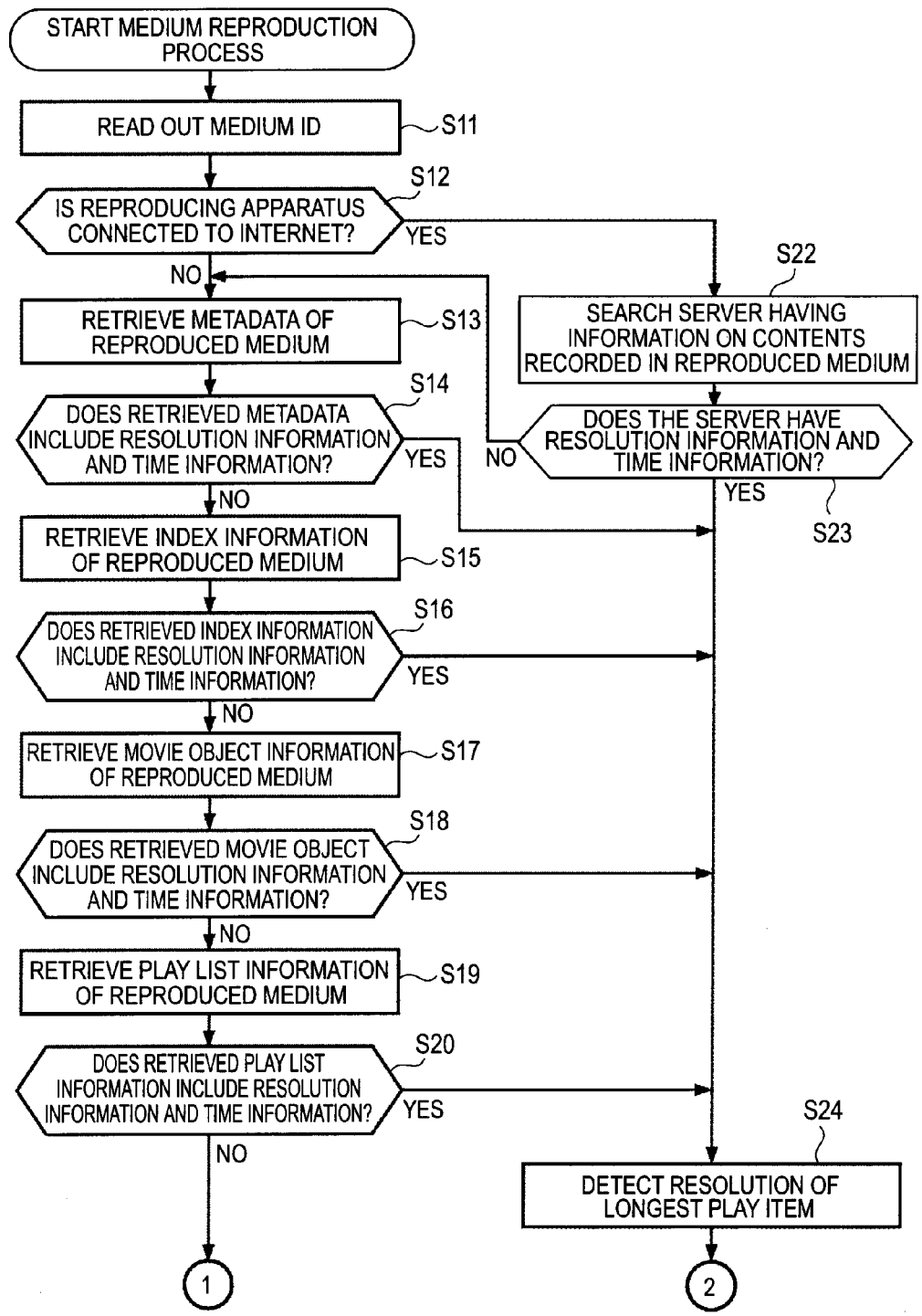
FIG. 12 is a flow chart for explaining a process of reproducing a medium.
Figure 13:
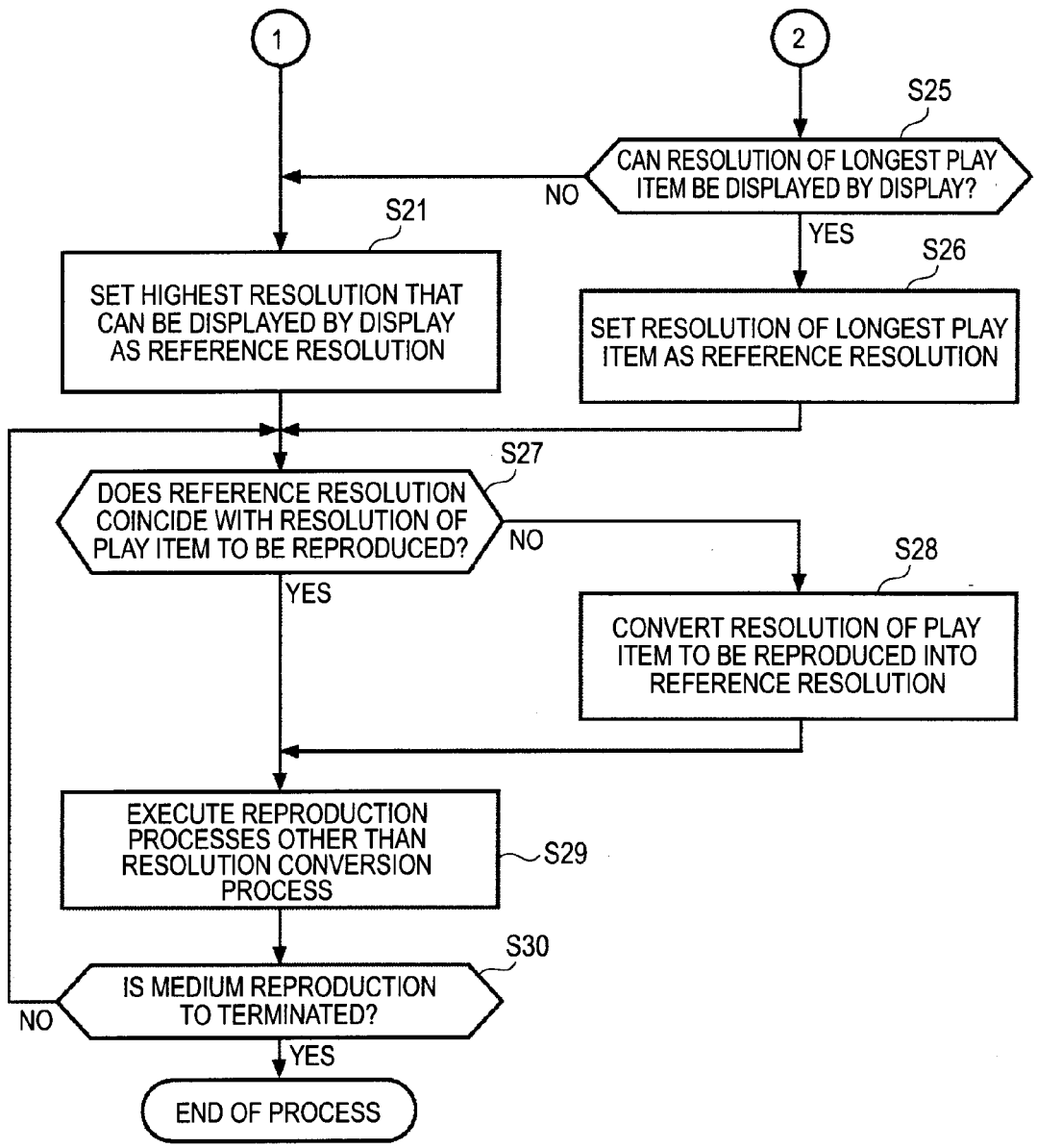
FIG. 13 is the continuation of the flow chart for explaining a process of reproducing a medium.

FIGS. 12 and 13 show a flowchart for explaining a process of reproducing a medium. A process of reproducing a medium will be described below with reference to the figures.

At step S11, the readout portion 81 of the system controller 53 reads a medium ID. Specifically, when a disc 30 is inserted in the drive section 21, the drive controller 35 drives the motor 31 through the servo section 36 to rotate the disc 30, whereby a predetermined track of the disc 30 is reproduced by the optical head 32 serving as a reproducing section. The reproduction signal is input to the demultiplexer section 41 through the RF processor 33. The demultiplexer section 41 separates a data signal from the reproduction signal and outputs the data signal to the system controller 53. From the input data signal, the readout portion 81 of the system controller 53 reads out the ID of the disc 30 as a medium.

At step S12, the determination portion 82 determines whether the reproducing apparatus is connected to the internet. When the reproducing apparatus 11 is not connected to the internet through the communication section 58, the retrieving portion 83 searches the data reproduced from the disc 30 to retrieve metadata of the medium to be reproduced at step S13. When metadata exist, the determination portion 82 determines whether the retrieved metadata include resolution information and time information at step S14.

When the retrieved metadata include neither resolution information nor time information, at step S15, the retrieving portion 83 searches the data reproduced from the disc 30 to retrieve index information of the medium to be reproduced. When index information exits, the determination portion 82 determines whether the retrieved index information includes resolution information and time information at step S16.

When the retrieved index information includes neither resolution information nor time information, at step S17, the retrieving portion 83 searches the data reproduced from the disc 30 to retrieve movie object information of the medium to be reproduced. When movie object information exists, the determination portion 83 determines whether the retrieved movie object information includes resolution information and time information at step S18.

When the retrieved movie object information includes neither resolution information nor time information, at step S19, the retrieving portion 83 searches the data reproduced from the disc 30 to retrieve play list information of the medium to be reproduced. When play list information exists, the determination portion 82 determines whether the retrieved play list information includes resolution information and time information at step S20.

As thus described, metadata, index information, movie object information, or play list information including resolution information and time information is retrieved from the data reproduced from the disc 30.

When resolution information and time information exists, at step S24, the detecting portion 85 detects the resolution of the longest play item of the medium from the metadata, the index information, the movie object information, or the play list information. For example, in the case of the contents shown in FIG. 11, the resolution of 1080/23.97p of the play item PI7 is detected because the play item has a reproduction time of 2 hours which is the longest among the reproduction times of the play items PI1 to PI8.

Instead of comparing the reproduction times of the play items to find the longest play item, for example, a main menu maybe searched to retrieve the main item of the contents, and the main item may be detected as the longest play item. The reason is that the main item of the contents has the longest duration in general when the contents are provided to a user. Therefore, the main item may be detected as the longest play item.

Specifically, among titles on an index table as shown in FIG. 6, the title having the greatest number of chapters is frequently the main item of the contents. Therefore, the number of chapters shown on the play list of each title may be counted, and the title having the greatest number of chapters may be detected as the main item of the contents or the longest play item.

At step S25, the determination portion 82 determines whether the resolution of the longest play item can be achieved by the display. In order to allow such determination to be properly made, the system controller 53 communicates with the display 13 through the HDMI communication section 49 to acquire EDID information from the display 13. The determination is made by comparing specification information included in the EDID information with the resolution of the longest play item. When the resolution of the longest play item can be achieved by the display 13, the setting portion 84 sets the resolution of the longest play item as a reference resolution at step S26.

When it is determined as a result of the execution of steps S14, S16, S18, and S20 that none of the metadata, the index information, the movie object information, and the play list information includes resolution information and time information, step S21 is carried out. Step S21 is carried out also when it is determined at step S25 that the resolution of the longest play item cannot be achieved by the display 13. At step S21, the setting portion 84 sets the highest resolution achievable by the display as a reference resolution.

When it is determined at step S12 that the reproducing apparatus 11 is connected to the internet, at step S22, the retrieving portion 83 carries out a search through the communication section 58 to find a server 14 where information on the content recorded in the reproduced medium is stored. The search is carried out based on the medium ID read in at step S11. The registration of information on contents recorded in a reproduced medium at a server 14 may be carried out by the provider of the contents or a user of the contents.

At step S23, the determination portion 82 determines whether resolution information and time information exists at the server 14 thus searched out. When neither resolution information nor time information exits at the server 14, the processes at step S13 and the subsequent steps are executed as described above to search metadata, index information, movie object information, or play list information to retrieve resolution information and time information.

On the contrary, when it is determined at step S23 that resolution information and time information exits at the server 14 thus searched out, at step S24, the resolution of the longest play item is detected from the resolution information and the time information retrieved at the server 14. Steps S25, S21, and S26 are executed as described above to set the highest resolution achievable by the display or the resolution of the longest play item as a reference resolution.

After a reference resolution is set at step S21 or S26 as described above, the determination portion 82 determines at step S27 whether the reference resolution coincides with the resolution of play items to be reproduced. When the reference resolution and the resolution of a play item to be reproduced do not coincide with each other, the converting portion 86 exercises control over the graphics display controller 47 at step S28. The graphics display controller 47 converts the resolution of the play item to be reproduced into the reference resolution under the control exercised by the converting portion.

When the reference resolution and the resolution of the play items to be reproduced coincide with each other, processes at step S28 associated with video signals are skipped.

Specifically, the graphics display controller 47 converts the resolution of each play item having a reproduction time shorter than that of the longest play item into the reference resolution. In the example shown in FIG. 11, the resolution (represented by reference numeral I-1 in FIG. 10) of the play items PI1, PI3, PI4, and PI8 and the resolution (represented by reference numeral I-4 in FIG. 10) of the play item PI2 are converted into the reference resolution (or the resolution of the longest play item PI7). The play items PI5 and PI6 are output as they are because they have the same resolution as that of the longest play item PI7.

Processes at step S29 are executed when it is determined at step S27 that the reference resolution coincides with the resolution of the play items to be reproduced or after the resolution of the play items to be reproduced is converted into the reference resolution. At step S29, the executing portion 87 executes reproduction processes other than the resolution converting process.

Specifically, signals reproduced from the disc 30 by the optical head 32 are converted into digital signals by the RF processor 33, and error correction is performed on the digital signals by the modulation/demodulation section 34. The demultiplexer section 41 outputs audio signals and video signals included in input signals from the modulation/demodulation section 41 to the audio decoder 42 and the video decoder 46, respectively.

The video decoder 46 decodes the input video signals. The graphics display controller 47 converts the signal formats of the video signals as described above. In the present embodiment, the resolutions of the signals are converted into the resolution of the longest play item.

As will be detailed later, the audio signals are decoded by the audio decoder 42, and the signal formats of the signals are thereafter converted by the audio DSP 43. That is, the signal formats are converted into the format of the longest play item.

The HDMI communication section 49 converts the video signals and the audio signals into signals in accordance with the HDMI standard and outputs the resultant signals to the display 13 through the HDMI terminal 50. The display 13 outputs images according to the video signals and outputs sounds according to the audio signals.

Since the signal formats of each play item are converted into the signal formats of the longest play item, even when contents including play items having different signal formats as shown in FIG. 11 are reproduced, no authentication process is carried out during the reproduction. It is therefore possible to prevent the reproduction of the contents from being interrupted at timing when one play item is switched to another.

At step S30, the determination portion 82 determines whether to terminate the reproduction of the medium based on an instruction from the user. When reproduction is not to be terminated, the process returns to step S27 to repeat step S27 and the subsequent steps.

When the reproduction of the medium is to be terminated based on the instruction from the user, the series of processes is terminated.

Similar processes are performed on audio signal formats.

Specifically, format information of audio signals is retrieved as signal format information instead of resolution information of video signals. At step S26, the format of audio signals of the longest play item is set as a reference format. Alternatively, the format of audio signals that can be output from the display 13 is set as a reference format at step S21.

At step S27, the determination portion 82 determines whether the reference format coincides with the format of play items to be reproduced. When the reference format does not coincide with the format of a play item to be reproduced, the converting portion 86 controls the audio DSP 43 at step S28. The audio DSP 43 converts the audio format of the play item to be reproduced into the reference format under the control exercised by the converting portion.

In the example shown in FIG. 11, the audio DSP 43 converts the format of audio signals of each of the play items PI1 to PI6 and PI8 into the Dolby TrueHD format. For example, a silent part of the play item PI1 is converted by the audio DSP 43 into a silent part in the Dolby TrueHD format. A PCM audio signal of the play item PI2 is converted by the audio DSP 43 into an audio signal in the Dolby TrueHD format.

When it is determined at step S27 that the reference format and the format of a play item to be reproduced coincide with each other, the conversion process at step S28 associated with audio signals is skipped.

As thus described, the processes shown in FIGS. 12 and 13 are executed for each of video and audio signals. As a result, even when there are play items between which the signal format of each of video and audio signals can vary, no authentication process is executed during reproduction. Therefore, the reproduction of contents is not interrupted at timing when the signal format of video signals or audio signals is switched to display a different play item.

[Alternative Process for Reproducing Medium]

The resolution information and time information of the medium after the medium is once reproduced may be recorded in the reproducing apparatus 11 or the disc 30. Such a mode of implementation of the embodiment will now be described with reference to FIGS. 14 and 15.

Figure 14:
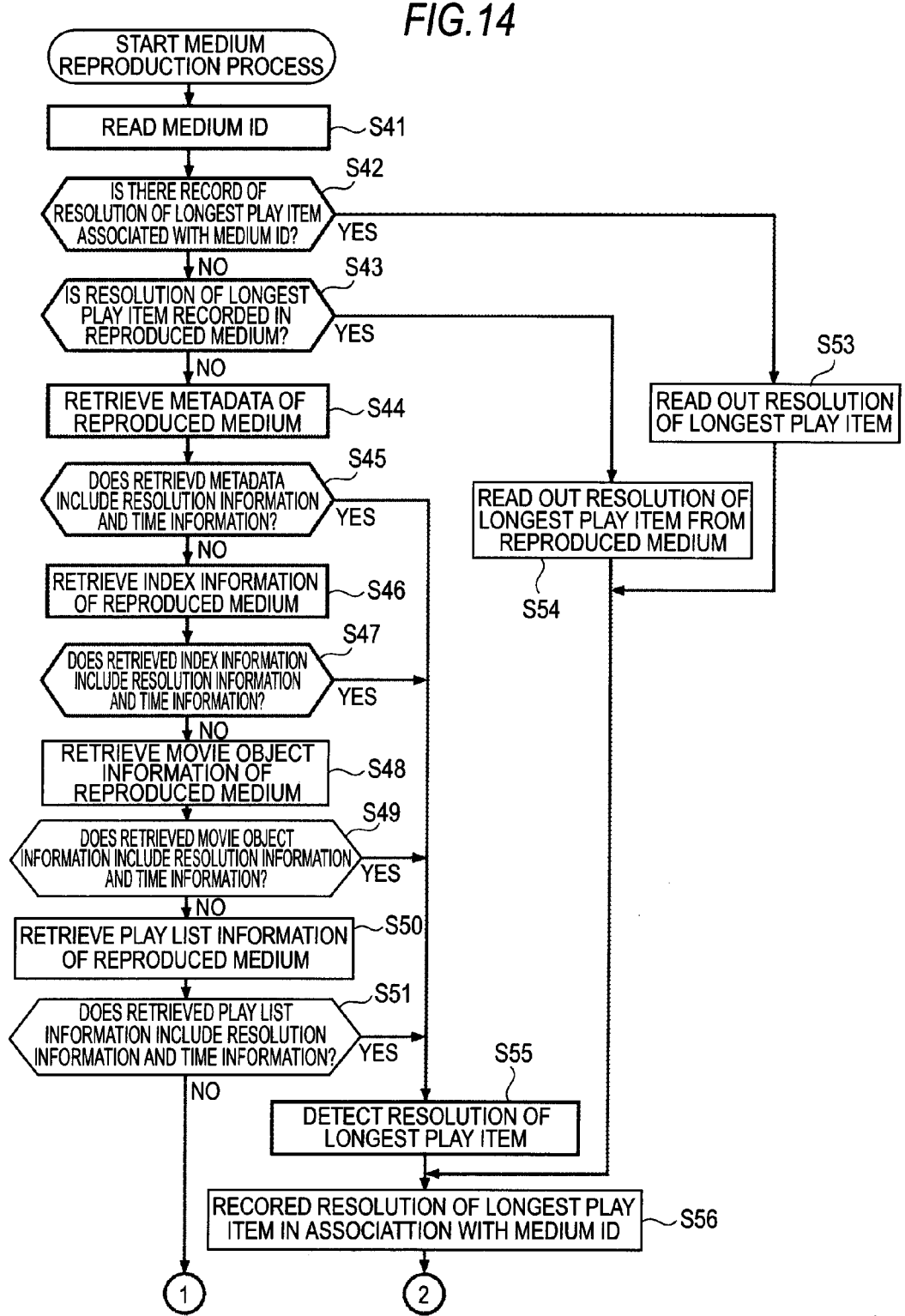
FIG. 14 is a flow chart for explaining a process of reproducing a medium.
Figure 15:
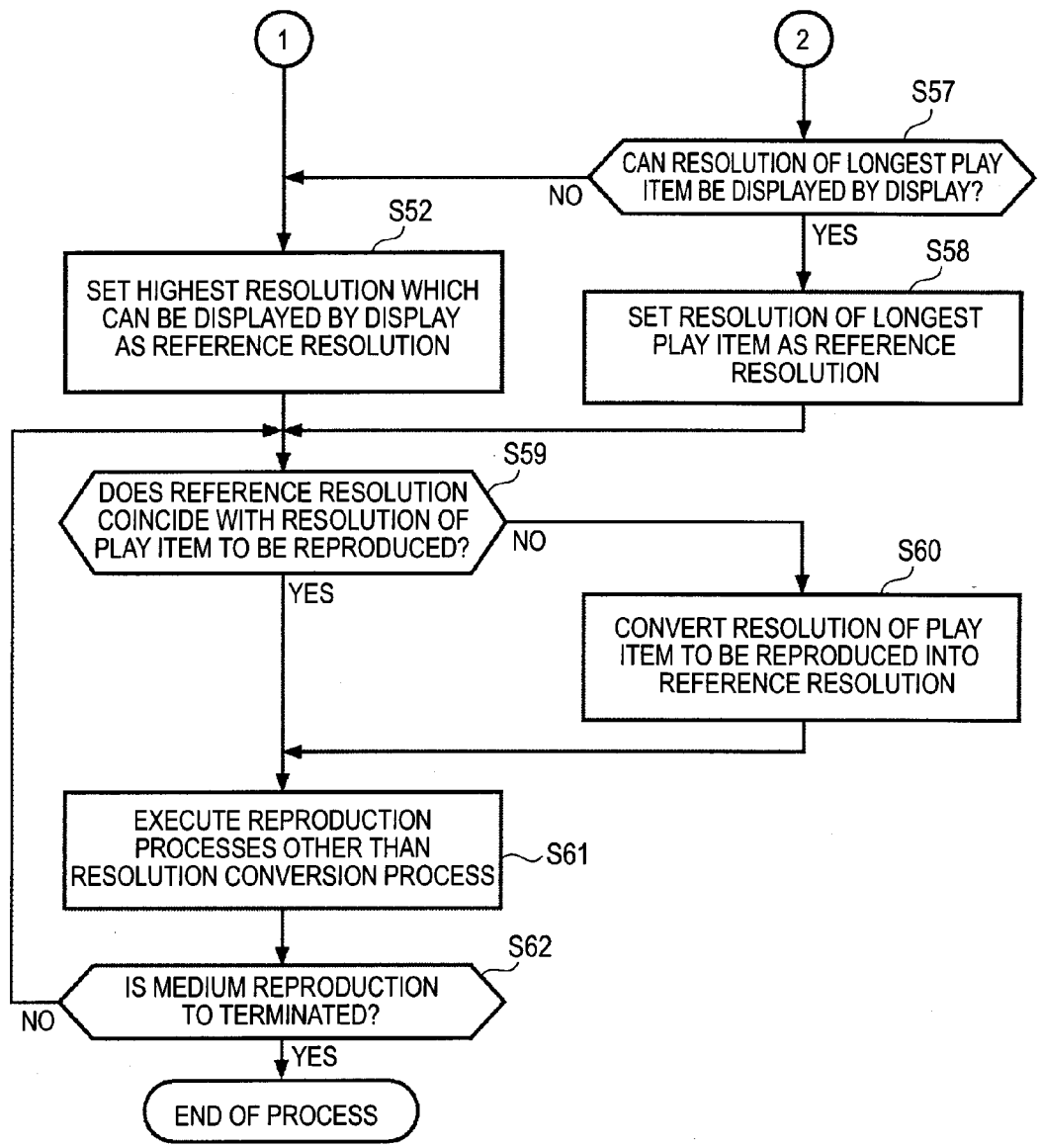
FIG. 15 is the continuation of the flow chart for explaining a process of reproducing a medium.

FIGS. 14 and 15 show a flow chart for explaining an alternative process for reproducing a medium.

At step S41, the readout portion 81 reads out a medium ID. Specifically, when a disc 30 is inserted in the drive section 21, the drive controller 35 drives the motor 31 through the servo section 36. Thus, the disc 30 is rotated, and a predetermined track of the disc 30 is reproduced by the optical head 32. A reproduction signal is input to the demultiplexer section 41 through the RF processor 33. The demultiplexer section 41 separates a data signal from the reproduction signal and outputs the signal to the system controller 53. The readout portion 81 reads out the ID of the disc 30 serving as a medium from the input data signal.

At step S42, the determination portion 82 determines whether there is a record of the resolution of the longest play item among play items associated with the medium ID. In the case of a reproduction-only medium (or a so-called "ROM disc") which has been once reproduced by the reproducing apparatus 11, the resolution of the longest play item of the medium may be recorded in the memory 54 at step S56 which will be described later. When the resolution of the longest play item associated with the medium ID has been recorded in the memory 54, the readout portion 81 reads out the resolution of the longest play item at step S53. That is, the resolution of the longest play item associated with the medium ID stored in the memory 54 is read out.

When it is determined at step S42 that the resolution of the longest play item associated with the medium ID is not recorded in the memory 54, the determination portion 82 determines whether the resolution of the longest play item has been recorded in the medium to be reproduced, at step S43. In the case of a writable medium which has been once reproduced, the resolution of the longest play item of the medium may be recorded in the medium to be reproduced itself at step S56 which will be described later. When the resolution of the longest play item among play items associated with the medium ID of the medium to be reproduced (or disc 30) has been recorded in the medium itself, the readout portion 81 reads out the resolution of the longest play item from the medium to be reproduced. Specifically, the resolution of the longest play item recorded in a file on a predetermined track of the disc 30 is read out. When such information has been recorded on a predetermined track of the disc 30 in addition to metadata, index information, movie object information, and play list information at the time of manufacture of the disc 30, the information is read out from the track.

When it is determined at step S43 that the resolution of the longest play item is not recorded in the medium to be reproduced, the retrieving portion 83 searches data reproduced from the disc 30 to retrieve metadata of the medium to be reproduced, at step S44. When metadata exist, the determination portion 82 determines whether the retrieved metadata include resolution information and time information at step S46.

When the retrieved metadata include neither resolution information nor time information, at step S46, the retrieving portion 83 searches the data reproduced from the disc 30 to retrieve index information of the medium to be reproduced. When index information exits, the determination portion 82 determines whether the retrieved index information includes resolution information and time information at step S47.

When the retrieved index information includes neither resolution information nor time information, at step S48, the retrieving portion 83 searches the data reproduced from the disc 30 to retrieve movie object information of the medium to be reproduced. When movie object information exists, the determination portion 82 determines whether the retrieved movie object information includes resolution information and time information at step S49.

When the retrieved movie object information includes neither resolution information nor time information, at step S50, the retrieving portion 83 searches the data reproduced from the disc 30 to retrieve play list information of the medium to be reproduced. When play list information exists, the system controller 53 determines whether the retrieved play list information includes resolution information and time information at step S51.

As thus described, metadata, index information, movie object information, or play list information including resolution information and time information is retrieved from the data reproduced from the disc 30.

When resolution information and time information exists, at step S55, the detecting portion 85 detects the resolution of the longest play item of the medium from the metadata, the index information, the movie object information, or the play list information. For example, in the case of the content shown in FIG. 11, the resolution of 1080/23.97p of the play item PI7 is detected because the play item has a reproduction time of 2 hours which is the longest among the reproduction times of the play items PI1 to PI8.

When the resolution of the longest play item is detected at step S55, step S56 is executed. Step S56 is executed also when the resolution of the longest play item stored in the memory 54 is read out at step S53 or when the resolution of the longest play item is read out from the reproduced medium at step S54. At step S56, the recording portion 88 controls the memory 54 such that the resolution of the longest play item is recorded in association with the medium ID in the memory 54 serving as a storing portion. This process is executed only when the medium to be reproduced is a reproduction-only medium or when the medium to be reproduced is a recordable medium. When the medium to be reproduced is a recordable medium, the resolution of the longest play item may be recorded in the medium to be reproduced instead of recording the resolution in the memory 54. The resolution of the longest play item is recorded in a file on a predetermined track of the medium to be reproduced as a piece of information separate from the metadata, the index information, the movie object information, and the play list information.

As thus described, in the case of a disc 30 which has been once reproduced, the resolution of the longest play item in the disc can be recorded in the memory 54 or the disc itself, which allows the resolution to be retrieved in a short time when the disc is reproduced next time.

After step S56 is executed, the determination portion 82 determines whether the resolution of the longest play item can be achieved by the display at step S57. In order to allow such determination to be properly made, the system controller communicates with the display 13 through the HDMI communication section 49 to acquire EDID information from the display 13. The determination is made by comparing specification information included in the EDID information with the resolution of the longest play item. When the resolution of the longest play item can be achieved by the display 13, the setting portion 84 sets the resolution of the longest play item as a reference resolution at step S58. At this time, the format of audio signals of the longest play item is set as a reference format.

When it is determined as a result of the execution of steps S45, S47, S49, and S51 that none of the metadata, the index information, the movie object information, and the play list information includes resolution information and time information, step S52 is carried out. Step S52 is carried out also when it is determined at step S57 that the resolution of the longest play item cannot be achieved by the display 13. At step S52, the setting portion 84 sets the highest resolution achievable by the display as a reference resolution. At step S21, the setting portion 84 sets the highest resolution achievable by the display as a reference resolution.

When a reference resolution is set at step S52 or S58 as described above, the determination portion 82 determines whether the reference resolution and the resolutions of play items to be reproduced coincide with each other, at step S59. When the reference resolution and the resolution of a play item to be reproduced do not coincide with each other, at step S60, the converting portion 86 controls the graphics display controller 47. The graphics display controller 47 converts the resolution of the play item to be reproduced into the reference resolution under the control exercised by the converting portion. When the reference resolution and the resolution of the play item to be reproduced coincide with each other, the process at step S60 is skipped.

Specifically, the graphics display controller 47 converts the resolution of each play item having a reproduction time shorter than that of the longest play item into the reference resolution.

When it is determined at step S59 that the reference resolution coincides with the resolution of the play items to be reproduced or after the resolution of the play items to be reproduced is converted into the reference resolution, the executing portion 87 executes reproduction processes other than the resolution converting process, at step S61.

At step S62, the determination portion 82 determines whether to terminate the reproduction of the medium based on an instruction from the user. When reproduction is not to be terminated, the process returns to step S59 to repeat step S59 and the subsequent steps.

When the reproduction of the medium is to be terminated based on the instruction from the user, the series of processes is terminated.

Similar processes are performed on audio signal formats in this alternative process.

Specifically, format information of audio signals is retrieved as signal format information instead of resolution information of video signals. At step S58, the format of audio signals of the longest play item is set as a reference format. Alternatively, the format of audio signals that can be output from the display 13 is set as a reference format at step S52.

At step S59, the determination portion 82 determines whether the reference format coincide with the format of play items to be reproduced. When the reference format does not coincide with the format of a play item to be reproduced, the converting portion 86 controls the audio DSP 43 at step S60. The audio DSP 43 converts the audio format of the play item to be reproduced into the reference format under the control exercised by the converting portion.

In the example shown in FIG. 11, the audio DSP 43 converts the format of audio signals of each of the play items PI1 to PI6 and PI8 into the Dolby TrueHD format. For example, a silent part of the play item PI1 is converted by the audio DSP 43 into a silent part in the Dolby TrueHD format. A PCM audio signal of the play item PI2 is converted by the audio DSP 43 into an audio signal in the Dolby TrueHD format.

When it is determined at step S59 that the reference format and the format of a play item to be reproduced coincide with each other, the conversion process at step S60 associated with audio signals is skipped.

As thus described, the processes shown in FIGS. 14 and 15 are executed for each of video and audio signals. As a result, even when there are play items between which the signal format of each of video and audio signals can vary, no authentication process is executed during reproduction. Therefore, the reproduction of contents is not interrupted at timing when the signal format of video signals or audio signals is switched to display a different play item.

[Modifications]

While the medium to be reproduced has been described above as a disc, media other than discs such as tapes and memories may be reproduced.

The embodiment of the invention can be used for reproducing contents according to standards other than the HDMI standard. In addition, the contents are not restricted to video signals and audio signals.

The above-described series of processes may be executed on a hardware basis, and the processes may alternatively be executed on a software basis. To execute the series of processes on a software basis, programs forming the software may be installed in a computer. Computers suitable for such a mode of implementation include computers incorporated in dedicated hardware and computers enabled for the execution of various functions by installing various programs therein such as general-purpose personal computers.

Programs executed by a computer in such a mode of implementation may be programs for executing the processes in a time-sequential manner in the order in which the processes are described in this specification or programs for executing the processes in parallel or as occasion demands, e.g., when called.

In the present specification, the term "system" means a complex unity formed by a plurality of apparatus.

Embodiments of the invention are not limited to those described above and can be variously modified insofar as they are within the gist of the invention.

The present application contains subject matter related to that disclosed in Japanese Priority Patent Application JP 2009-193283 filed in the Japan Patent Office on Aug. 24, 2009, the entire contents of which is hereby incorporated by reference.

What is claimed is:

1. An information processing apparatus comprising:
   a detecting portion detecting a signal format of a particular reproduction interval having the longest reproduction time among contents constituted by a plurality of reproduction intervals; and
   a converting portion converting signal formats of the reproduction intervals of the contents other than the particular reproduction interval into the signal format of the particular reproduction interval.

2. The information processing apparatus according to claim 1, further comprising an output portion converting the contents having the converted signal formats into signals according to the HDMI standard and outputting the signal to another apparatus.

3. The information processing apparatus according to claim 2, wherein the signal formats are defined by a video signal resolution and an audio signal encoding/compression method.

4. The information processing apparatus according to claim 3, further comprising a reproducing portion reproducing the contents from a disc.

5. The information processing apparatus according to claim 4, further comprising:
   a storage portion for storing the signal format of the particular reproduction interval of the disc when the disc is reproduced; and a retrieving portion retrieving the signal format of the particular reproduction interval stored in the storage portion when the disc is reproduced again.

6. The information processing apparatus according to claim 4, wherein the detecting portion detects a main item of the contents as the particular reproduction interval.

7. The information processing apparatus according to claim 4, further comprising a recording portion recording the signal format of the particular reproduction interval as a file separate from the contents.

8. The information processing apparatus according to claim 7, further comprising a retrieving portion retrieving the signal format of the particular reproduction interval from a server through a network.

9. information processing method of an information processing apparatus having a detecting portion and a converting portion, the method comprising the steps of :

detecting a signal format of a particular reproduction interval having the longest reproduction time among contents constituted by a plurality of reproduction intervals, the step being carried out by the detecting portion; and converting signal formats of the reproduction intervals of the contents other than the particular reproduction interval into the signal format of the particular reproduction interval, the step being carried out by the converting portion.

10. A non-transitory computer readable medium storing a program for causing a computer to function as detecting means and converting means, the program comprising the steps of:

detecting a signal format of a particular reproduction interval having a longest reproduction time among contents constituted by a plurality of reproduction intervals, the step being carried out by the detecting means; and converting signal formats of the reproduction intervals of the contents other than the particular reproduction interval into the signal format of the particular reproduction interval, the step being carried out by the converting means.

* * * * *